US007295639B1

(12) United States Patent
Cory

(10) Patent No.: US 7,295,639 B1
(45) Date of Patent: Nov. 13, 2007

(54) DISTRIBUTED ADAPTIVE CHANNEL BONDING CONTROL FOR IMPROVED TOLERANCE OF INTER-CHANNEL SKEW

(75) Inventor: Warren E. Cory, Redwood City, CA (US)

(73) Assignee: XILINX, Inc., San Jose, CA (US)

( * ) Notice: Subject to any disclaimer, the term of this patent is extended or adjusted under 35 U.S.C. 154(b) by 837 days.

(21) Appl. No.: 10/622,204

(22) Filed: Jul. 18, 2003

(51) Int. Cl.
    *H04L 7/00* (2006.01)
(52) U.S. Cl. .................................. 375/371; 370/516
(58) Field of Classification Search ........ 375/354–355, 375/365, 371–372; 370/503, 505, 506, 512–514, 370/516
    See application file for complete search history.

(56) References Cited

U.S. PATENT DOCUMENTS 5,856,999 A * 1/1999 Robinson et al. ........... 375/221
6,907,552 B2 * 6/2005 Collins ........................ 714/700
6,944,691 B1 * 9/2005 Li et al. ...................... 710/106
7,103,071 B1 * 9/2006 Lerner ......................... 370/503
7,106,760 B1 * 9/2006 Perumal et al. ............. 370/535

OTHER PUBLICATIONS

Harry Newton, Newton's Telecom Dictionary, published by CMP Books, ISBN No. 1-57820-069-5, Seventeenth Edition, Feb. 2001.*
U.S. Appl. No. 10/090,250, filed Mar. 1, 2002, Menon et al.
U.S. Appl. No. 10/082,490, filed Feb. 22, 2002, Cory.
U.S. Appl. No. 10/234,978, filed Sep. 3, 2002, Cory et al.

* cited by examiner

*Primary Examiner*—Khanh C. Tran
(74) *Attorney, Agent, or Firm*—Justin Liu

(57) ABSTRACT

A method and apparatus for improving tolerance of inter-channel skew in channel bonded communications links includes designating a master channel and one or more slave channels. Each slave channel develops its own model of skew relative to the master channel. When its skew model is validated, a slave channel can perform channel bonding on its own. The skew models are developed over time, and therefore improve tolerance of inter-channel skew over prior art channel bonding methods.

29 Claims, 5 Drawing Sheets

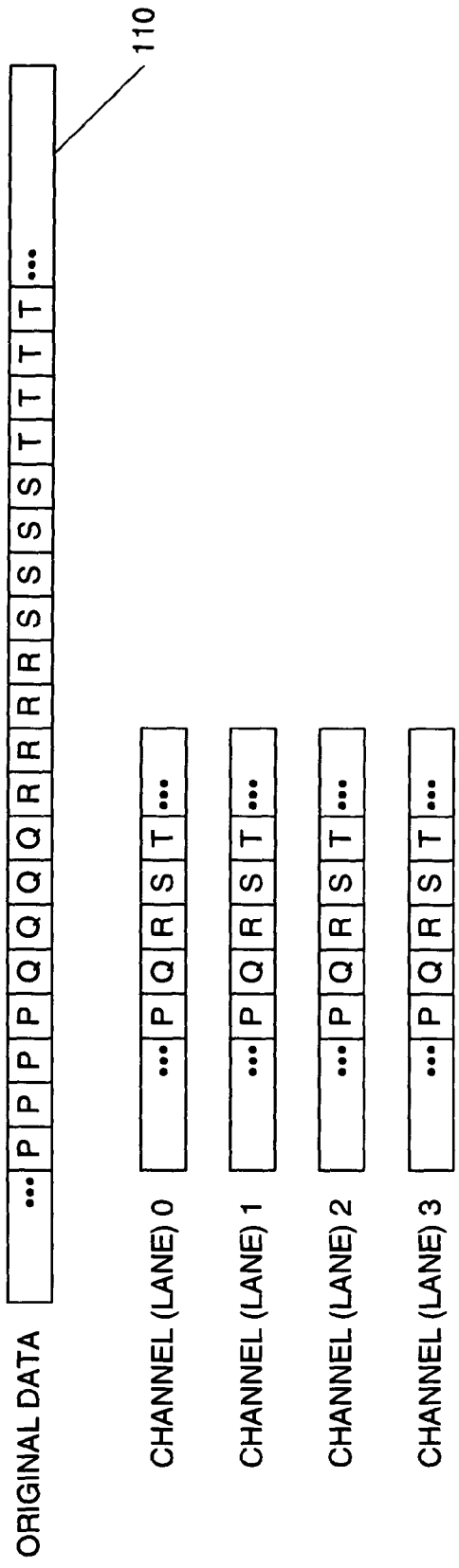
FIG. 1A  TRANSMITTER SIDE
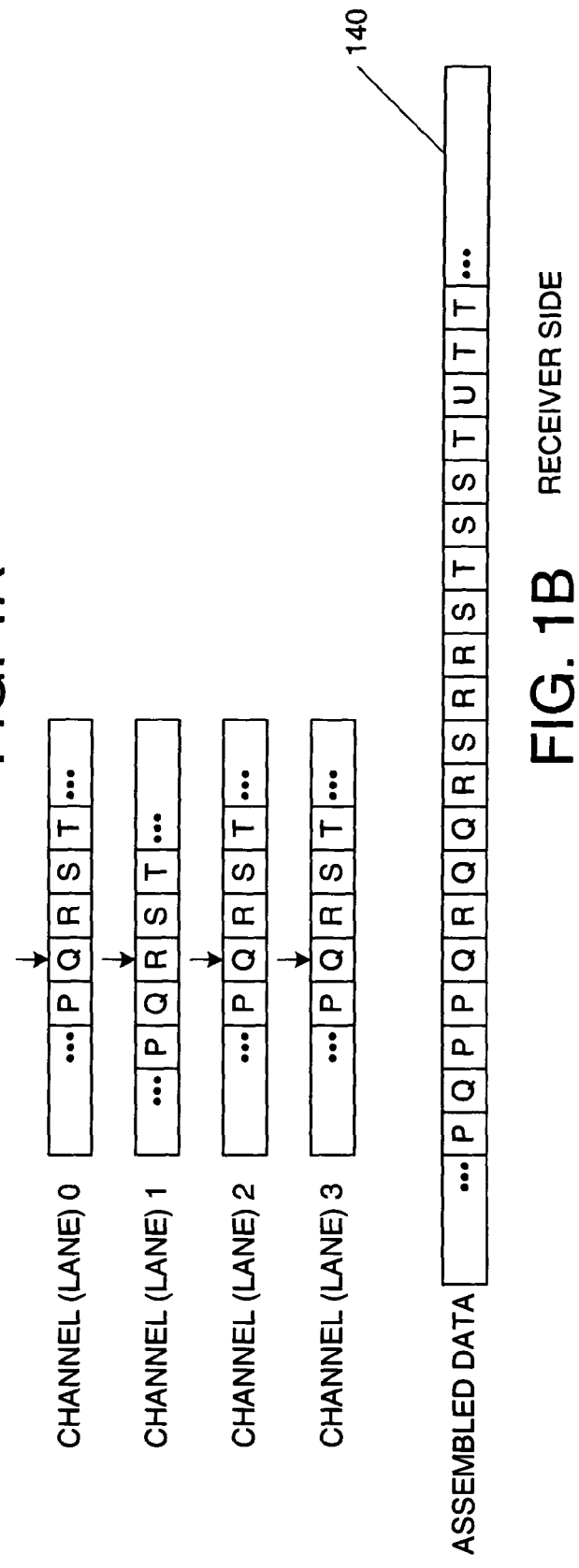
FIG. 1B  RECEIVER SIDE

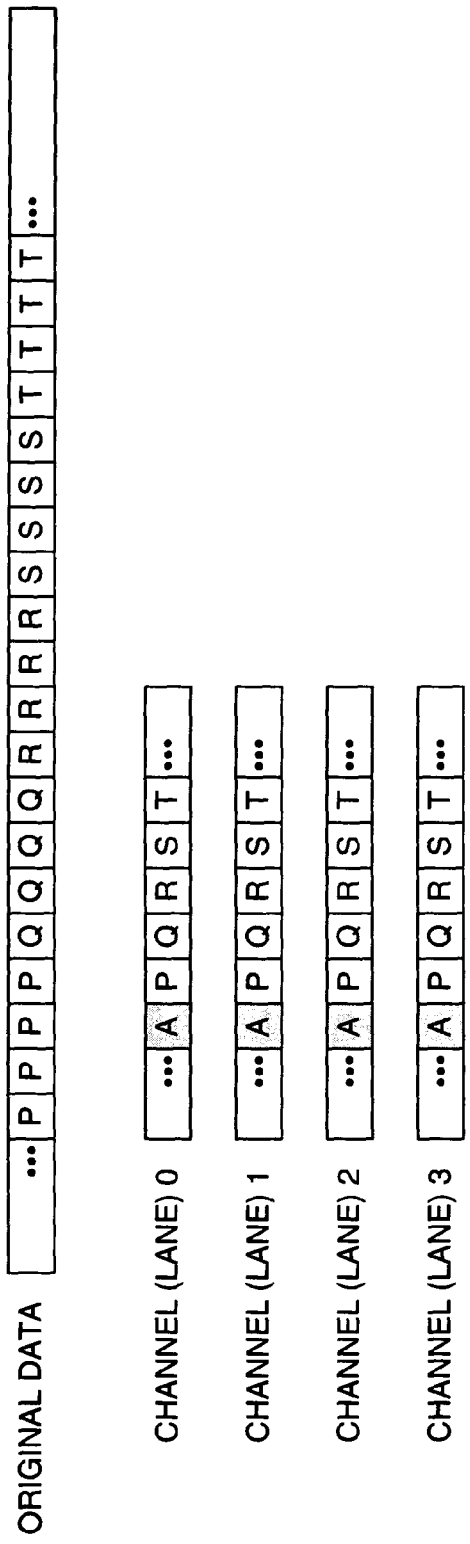
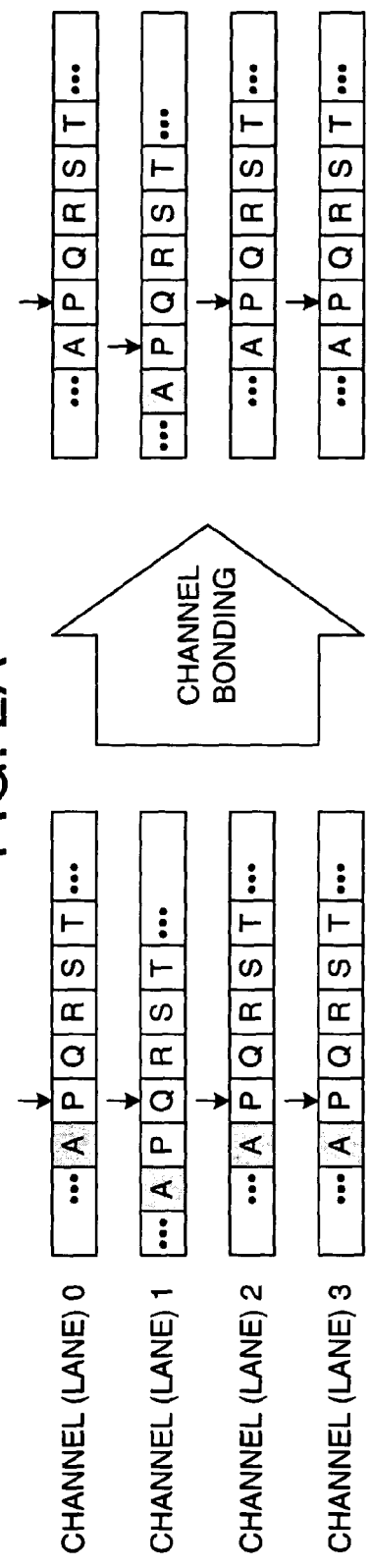
FIG. 2A TRANSMITTER SIDE
FIG. 2B RECEIVER SIDE

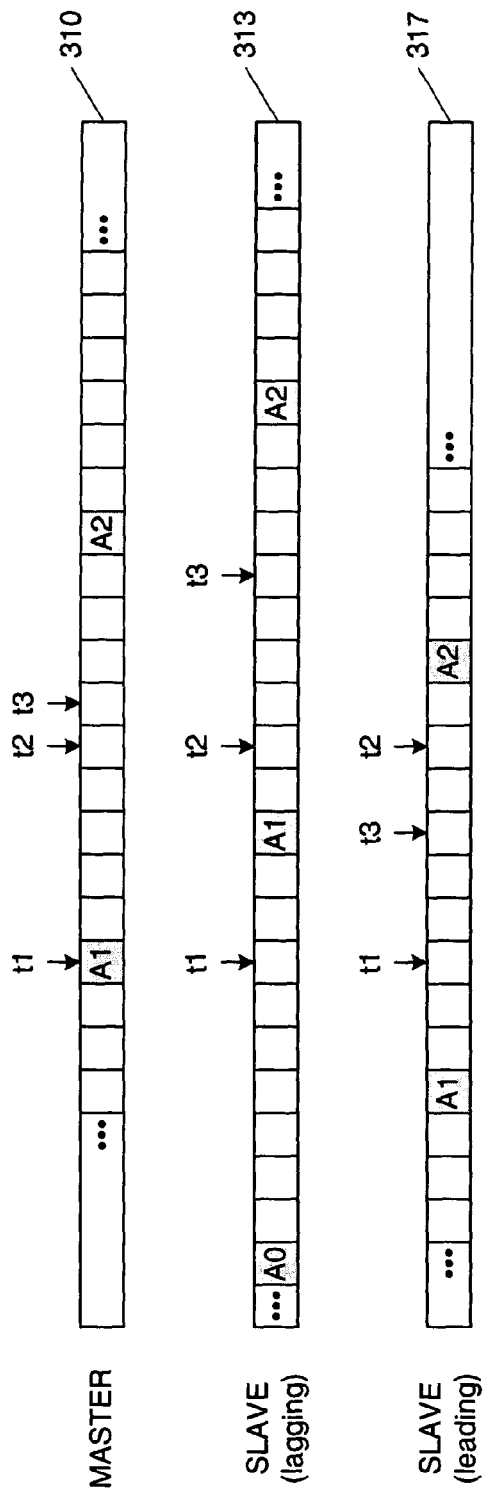
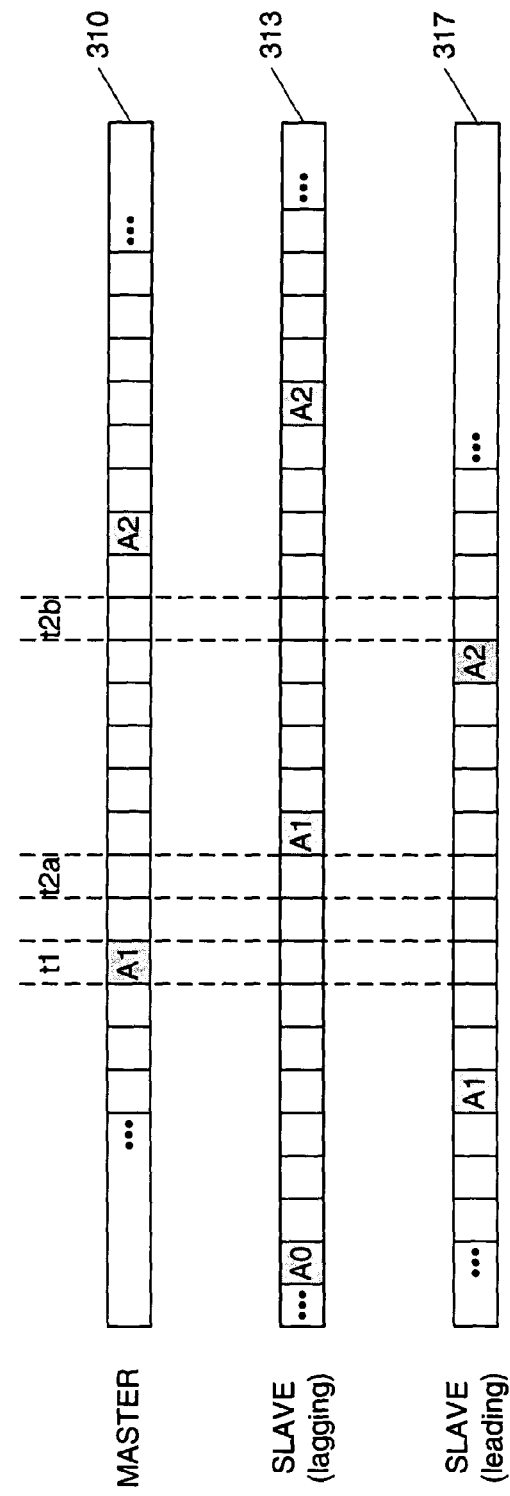
FIG. 3A
FIG. 3B

DISTRIBUTED ADAPTIVE CHANNEL BONDING CONTROL FOR IMPROVED TOLERANCE OF INTER-CHANNEL SKEW

FIELD OF THE INVENTION

The invention relates to communications, and more particularly, to channel bonding.

BACKGROUND OF THE INVENTION

In order to achieve higher data rates, multiple communications links, or communications channels, can be used together in parallel to form a single communications link having high bandwidth. This technique of creating one high-speed "virtual" channel out of several parallel channels is known as channel bonding, alignment or channel alignment. For example, words of data can be split into bytes, with each byte being sent over a separate communications channel by separate transmitters. The bytes of data are received by separate receivers, and then reassembled into the original data stream. For instance, four transmitters (or transceivers) can be used to transmit a data stream consisting of four-byte words, where each transmitter sends one byte of every word. Four corresponding receivers (or transceivers) each receive one byte of every word, and logic at the receiver end reassembles the bytes from each receiver into the original data stream of four-byte words.

Many current and proposed communications standards use channel bonding to achieve high data rates. For example, the XAUI interface, part of the IEEE 802.3ae 10 Gigabit Ethernet standard, provides a 10 Gb/s (Gigabits per second) communications channel by using four transmit and receive channels, each operating at 3.125 Gb/s. As another example, the Infiniband Architecture for I/O allows up to twelve 2.5 Gb/s full duplex serial links to be used together to provide a single channel with a bandwidth of up to 30 Gb/s.

One challenge in the channel bonding process is slight variations between the individual communication channels can cause the data in one or more channels to become misaligned with respect to the other channels. That is, because the transmission delays through the channels, including the delays through the transceivers, are not identical, the data in the channels can become skewed, which can lead to the incorrect reassembly of data words at the receiver end. For instance if a data byte sent through one channel reaches the receiver earlier or later than data bytes from the same data word sent through the other channels, that early or late data byte will be assembled into the wrong data word. To account for these variations, alignment markers can be used by the receivers as reference points to align the data and correct for variations in delay. An alignment marker is usually a special byte (or other series of bits) that is not used in transmitting regular data. At certain intervals, the transmitters will send alignment markers simultaneously in all channels to help receivers align. Typically, the receivers each have an elastic buffer and control logic at the receiver end can use the alignment markers to adjust read or write pointers in the elastic buffers to achieve channel bonding. However, prior art methods for channel bonding can only correct for variations that are less than approximately half the interval between alignment markers. As communication rates continue to increase, prior art channel bonding methods may not be able to compensate and correct for all possible variations in communications channels.

Therefore, methods for channel bonding with improved tolerance for inter-channel skew are needed.

SUMMARY OF THE INVENTION

A method for channel bonding multiple communications channels includes receiving master and slave alignment markers and developing a model of skew within a channel based on the received alignment markers. The skew model can be used to align a slave channel to a master channel. In accordance with the present invention, the skew between a master alignment marker and a slave alignment marker is measured, and that measured skew is stored. In one embodiment, the skew is measured by counting the number of clock cycles that occur between a master marker and a slave marker. The measured skew can be compared with a previously stored count, and a stable count total can be used to indicate the reliability of the skew model. One or more skew models can be used, each with different assumptions about the skew, and an arbiter can be used to choose one model to use for channel bonding. The modeled skew can be used to adjust an elastic buffer in the receiver to correct for the skew.

Additional novel aspects and embodiments are described in the detailed description below. The appended claims, and not this summary, define the scope of the invention.

BRIEF DESCRIPTION OF THE DRAWINGS

The present invention is illustrated by way of example, and not by way of limitation, in the following figures, in which like reference numerals refer to similar elements.

FIGS. 1A and 1B show the transmitter end and the receiver end of an example of channel bonding where misalignment has occurred due to variations in delay.

FIGS. 2A and 2B show the transmitter end and the receiver end of an example of channel bonding with alignment markers and correction for variations in delay.

FIGS. 3A and 3B show a master channel and two slave channels on the receiver end with examples of channel bonding timing.

DETAILED DESCRIPTION

Figure 4:
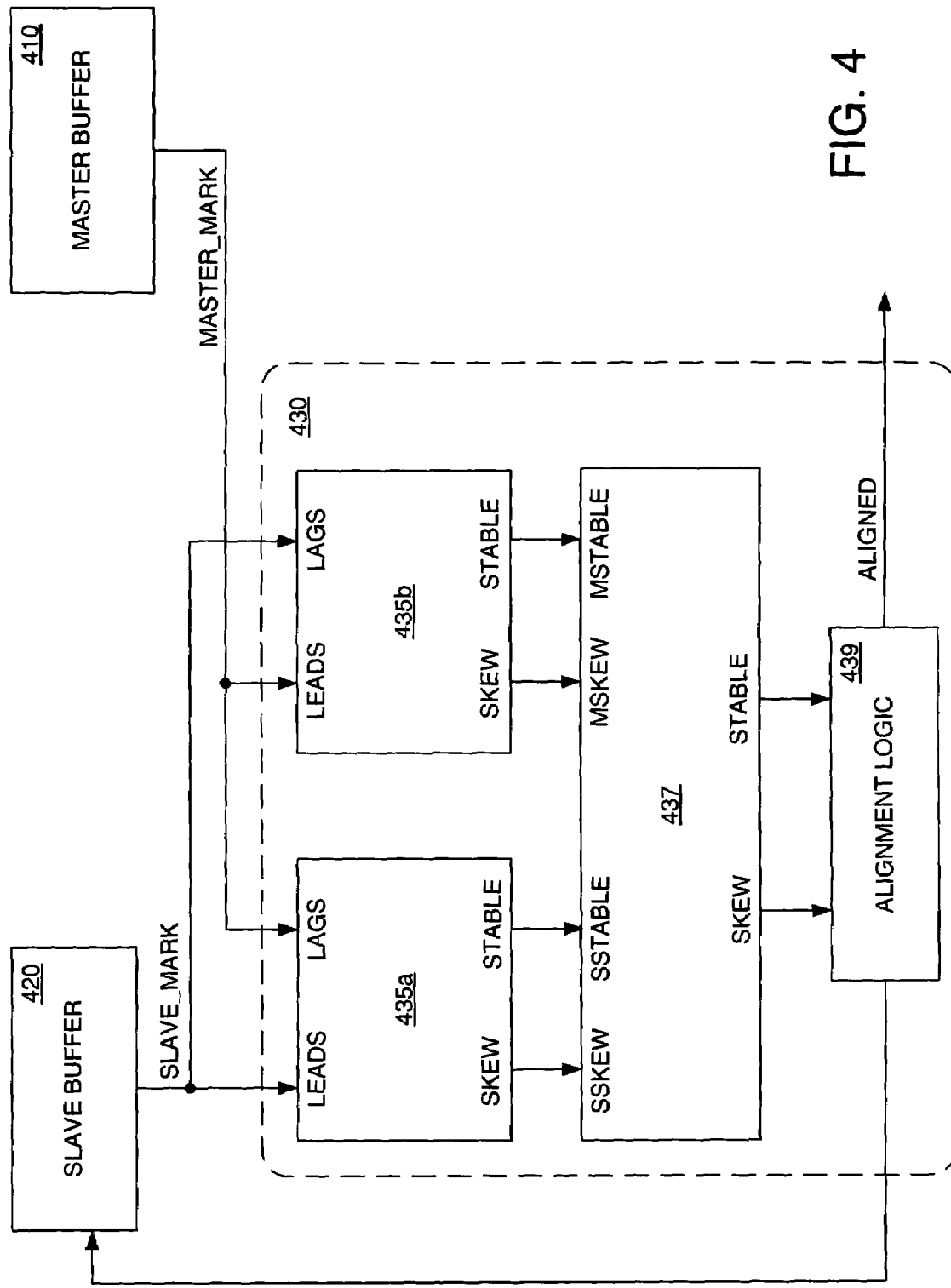
FIG. 4 shows a block diagram representation of control logic at the receiver end.

The present invention is believed to be applicable to a variety of high-speed communications systems. While the present invention is not so limited, an appreciation of the present invention is presented by way of specific examples, and numerous specific details are set forth to provide a more thorough understanding of the present invention. However, it will be apparent to one ordinarily skilled in the art that the present invention can be practiced without these specific details. In other instances, well-known circuits and devices may be omitted or presented in abstract form in order to avoid obscuring the present invention.

FIG. 1A shows an example of channel bonding at a transmitter end, and FIG. 1B shows the same example from the receiver end. A portion of an original data stream 110 comprises a sequence four-byte data words: PPPP, QQQQ, RRRR, SSSS, and TTTT. In FIG. 1, each box represents a byte of data, and bytes with the same label are part of the same data word. In this example, data stream 110 is divided into four channels, or lanes, for transmission. That is, each data word is split into its four component bytes, and each byte is then transmitted over a separate communication channel. For instance, data word QQQQ is split into four bytes, and each channel 0-3 transmits one of the bytes of the data word.

FIG. 1B shows the data received at the receiver end of the four channels. The data in the four channels is written into an elastic buffer. Typically, this elastic buffer is modified FIFO that has two asynchronous clocks for writing data to and reading data from, respectively, the elastic buffer. The two clocks run at the same nominal frequency, but can differ slightly, in some cases by up to 200 ppm (parts per million) or more. As is known to those of ordinary skill in the art, the buffer can execute clock corrections to compensate for the differences between the write and read clocks, and thereby avoid overflow or underflow conditions. Typically, the buffer has a write pointer for indicating the location of the next byte to be written (or the last byte written) into the buffer, and a read pointer for indicating the next byte to be read (or the last byte read) out of the buffer. In the following discussion focuses on the read pointer and adjustments to the read pointer, but as will be readily apparent to one of ordinary skill in the art, analogous techniques can be used in conjunction with the write pointers in accordance with the present invention.

As stated earlier, due to slight variations in the communications channels, the delay through each of the channels is not identical and leads to skew between the channels. As an example, as shown in FIG. 1B, data in channel 1 arrives one cycle earlier than the data in the other channels. Note the arrows in FIG. 1B indicate the location of the read pointer in each channel's elastic buffer. Without the channel bonding process, the data stream in the example shown in FIG. 1B is assembled incorrectly due to the skew between channel 1 and the other channels. Thus, assembled data stream 140 does not match the original data stream 110, and the communication of data is unsuccessful.

FIGS. 2A and 2B show an example where alignment markers and channel bonding are used to correct skew in one of the channels. FIG. 2A shows an original data stream having four-byte words that is divided into four channels for transmission. In contrast to the example in FIG. 1, each channel also transmits an extra byte for performing channel alignment. This extra byte is known as an alignment marker and is indicated by the gray box marked "A" in the figures. The alignment marker is a special byte (or sequence of bytes) that can be distinguished from regular data bytes, and is sent simultaneously in all four channels.

At the receiver end, the alignment markers can be used to align the channels and correct for any skew that may have occurred during transmission. The left side of FIG. 2B indicates the position of the read pointers in each of the four channels before alignment. As in the example of FIG. 1B, the data in channel 1 arrives one byte earlier than the data in the other three channels. Using the alignment markers, the read pointers can be adjusted to correct for the inter-channel skew. In this example, the right side of FIG. 2B indicates the position of the read pointers after channel bonding has occurred. Note that the read pointer for channel 1 has been shifted to compensate for the skew in that channel, and that the read pointers in the four channels all point to bytes corresponding to the same original data word. The data can now be assembled correctly into a data stream that is identical to the original data stream.

In channel bonding, one channel is usually designated a "master" channel and the other channels are designated "slave" channels. The master channel is always considered to be in alignment, and the slave channels each align to the master. The buffers in each channel can recognize the alignment marker, and can remember the location of alignment markers within the buffer. At some point in time, the master channel can instruct the slaves to align to an alignment marker, or to a location relative to the alignment marker. The slaves then align to the master based on the information broadcast by the master.

In FIG. 3A, an example of channel bonding is shown, including a master 310 and two slaves 313 and 317. The location of two markers, A1 and A2, are shown for each buffer. Note that slave 313 lags the master (i.e., data arrives in slave 313 after it has arrived in master 310) and slave 317 leads master 310. The arrows in FIG. 3A indicate the position of the read pointer for each buffer at the time indicated. At time t1, channel bonding has not yet occurred (i.e., the master has not yet instructed the slave channels to align), and there is no compensation for or correction of the inter-channel skew.

At a time t2, master 310 instructs the slaves to align, based on the location of marker A1. Each slave buffer examines its data and determines the relative position of the last alignment marker observed. In both slave 313 and slave 317, the last marker observed is A1. At a time t3, the slaves have adjusted their read pointers to compensate for the skew. At this point, the three channels are in alignment.

In prior art methods, the master channel is in complete control of the channel bonding process, and dictates to the slave channels when they should perform alignment. That is, the master channel sends the "align" instruction that causes the slaves to align. Typically, the master waits for a certain period of time after it receives an alignment marker before sending the align instruction. One challenge in these prior art channel bonding methods is determining the how long the master channel should wait. A longer waiting period helps a slave that is lagging the master, since in order for that slave to align correctly, the master must wait at least until the slave receives the lagging alignment marker. That is, if the master sends an align instruction before the slave has received its corresponding alignment marker, the slave will align based on the incorrect marker (e.g., based on the marker corresponding to the previous set of alignment markers), thus leading to misalignment. Therefore, the longer the waiting period, the more likely that a lagging slave will have received the corresponding marker, and consequently, the greater the skew that can be tolerated for such a lagging slave. Conversely, a shorter waiting period is desirable for cases where a slave channel leads the master channel. When the slave leads the master, the slave will receive its slave alignment marker first, before the master receives its master alignment marker. If the waiting period is too long, the slave may have already received the next alignment marker by the time the master sends the align instruction, thereby causing the slave to align to the wrong marker. Therefore, a shorter waiting period increases the likelihood that the slave will not have received the next marker, and improves skew tolerance for slaves that lead the master.

This balancing between a long and short waiting period is illustrated in FIG. 3B. FIG. 3B again shows master 310 and slaves 313 (lagging the master) and 317 (leading the master). At a time t1, the master receives alignment marker A1. Slaves 313 and 317 receive corresponding marker A1 after and before time t1, respectively. If the master waits only a short period before sending an align instruction at time t2a, leading slave 317 aligns to marker A1 correctly, but lagging slave 313 will align to the wrong marker. This is due to the fact that the align instruction arrives before slave 313 receives marker A1, thereby causing slave 313 to align incorrectly based on marker A0. Similarly, if the master waits a long time and sends the align instruction at time t2b, slave 313 will now align correctly to marker A1, but leading slave 317 now aligns incorrectly. That is, since there is a long waiting period between the time that master 310 receives marker A1 (time t1) and the time that master 310 issues the align instruction (time t2b), leading slave 317 has already received marker A2 at time 2b, and will align incorrectly to that marker.

Thus, in cases when a slave can either lead or lag the master, there is a tradeoff between having a short or long waiting period before the master issues an align instruction to cause channel bonding. If the slaves are equally likely to lead or lag the master, the maximum inter-channel skew that can be corrected using such prior art methods is approximately one-half the minimum distance between consecutive alignment markers. Internal sources of skew within the master and slave transceivers can cut significantly into this margin and can further reduce this maximum correctable skew. For example, if a particular protocol calls for a minimum of sixteen bytes separating consecutive alignment markers, a maximum skew of approximately eight bytes can be corrected by prior art methods, with internal sources of skew effectively reducing this maximum to as low as four bytes or even lower. As data rates continue to increase, the actual inter-channel skew (measured in bytes) may increase while tolerance of the skew may decrease (due to increased skew from internal sources), and prior art methods will not be able to achieve channel bonding.

In accordance with the present invention, a method for channel bonding comprises each slave channel developing its own model of the inter-channel skew between the slave channel and a master channel. Each slave channel can then use its skew model to perform channel alignment. In contrast to prior art methods, the slave channels do not depend on "align" instructions sent by the master, and therefore the system can tolerate greater inter-channel skew. Instead, the master merely informs each slave channel of the arrival of master alignment markers, and each slave channel determines on its own when to perform alignment. For example, a slave can perform alignment when it has validated its own skew model by modifying pointers in its elastic buffer. The slave channel develops the model of the skew by observing master and slave alignment markers over time. This method allows for tolerance of greater inter-channel skew than the prior art methods.

FIG. 4 shows a block diagram representation of control logic for performing channel bonding at the receiver end of a communications link comprising multiple channels. A master elastic buffer 410 and a slave elastic buffer 420 are shown. These buffers store incoming data as it is received, and have adjustable read and write pointers for facilitating channel bonding. Two signals MASTER_MARK and SLAVE_MARK indicate occurrences of alignment markers in the master and slave buffers, respectively. That is, MASTER_MARK is asserted when the master reads an alignment marker from its elastic buffer 410. Similarly, SLAVE_MARK is asserted when the slave reads an alignment marker from buffer 420. Note that while only one slave channel is shown in FIG. 4, an arbitrary number of slave channels can be used in accordance with the invention, each with its own buffer and control logic.

The slave channel has control logic 430 for developing a skew model. Control logic 430 has receives MASTER_MARK and SLAVE_MARK as inputs. These inputs feed into two identical skew model blocks 435a and 435b that are each used to develop a model of the skew between two channels based on an assumption that one channel is leading the other. Skew model blocks 435a and 435b each have two inputs, LEADS and LAGS. The LEADS input indicates the occurrence of an alignment marker in the channel that is assumed to be leading. The LAGS input indicates an alignment marker in the channel assumed to be lagging. Skew model blocks 435a and 435b differ only in the assumption each is based on. Specifically, skew model block 435a is based on the assumption that the slave channel is leading the master channel, and skew model block 435b is based on the assumption that the slave lags the master.

Skew model blocks 435a and 435b each produce two outputs SKEW and STABLE. The SKEW output of each block indicates the modeled skew between the two channels. For example, the skew can be the number of bytes or clock cycles that the leading channel leads the lagging channel. The STABLE output indicates the validity and stability of that modeled skew. For instance, a STABLE output equal to 0 can mean that the SKEW output is not valid and that the inter-channel skew has not yet been determined. Non-zero values of the STABLE output can indicate that the SKEW value is valid, with higher values corresponding to a greater confidence in the SKEW value.

The SKEW and STABLE outputs from each of skew model blocks 435a and 435b are inputs to an arbiter block 437. Arbiter block 437 has inputs SSKEW and SSTABLE that represent the SKEW and STABLE values from the skew model block based on an assumption that the slave leads the master (e.g., skew model block 435a). Inputs MSKEW and MSTABLE to arbiter block 437 correspond to the SKEW and STABLE values from a skew model block based on an assumption that the master channel leads the slave (e.g., skew model block 435b). Based on these inputs, arbiter block 437 decides which model is correct and asserts output signals SKEW and STABLE with the values from the skew model block that arbiter block 437 decides is correct. Typically, arbiter block 437 will select the model that has a non-zero STABLE value, since that indicates a validated skew model. Alignment logic 440 uses the SKEW and STABLE outputs of arbiter block 437 to adjust the pointers in slave buffer 420 and align the slave channel to the master channel. For example, if slave control logic 430 indicates that the slave channel lags the master channel by 6 bytes, the read pointer in slave buffer 420 can be moved forward 6 bytes. Alignment logic 440 can also assert an ALIGNED output signal when it has caused slave buffer 420 to align. Since each slave channel individually determines when to perform alignment, the ALIGNED signals from all the slave channels can be combined (e.g., by using an AND gate) to indicate when the entire communications link is in alignment and channel bonding for the link has been achieved.

Note that once a slave channel has aligned to a master channel, then the skew detected by skew model blocks 435a and 435b should be zero. That is, the slave channel is properly aligned so there is no skew between the master and the slave channels. If at any subsequent point alignment is lost and alignment needs to be reestablished, the slave channel may cancel the prior adjustment in its elastic buffer (e.g., reset the pointers to their original state) before attempting to realign. Otherwise any subsequent determination of skew might be biased. Alternatively, an adjustment can be made to the timing of the MASTER_MARK and SLAVE_MARK signals so that the skew model blocks see an unadjusted skew, even after the channel has performed alignment. Note further that in one embodiment, skew model blocks 435a and 435b may differ slightly in that only one of the two will detect a zero skew.

In some cases, both skew models provided by skew model blocks 435a and 435b have non-zero STABLE values, meaning that both skew models have been validated. This can occur, for instance, when alignment markers are always sent at regular intervals, such as after every nine bytes of data. If the slave channel actually lags the master by 4 bytes in such an instance, skew model 435b will indicate a validated skew model of the master leading the slave by 4 bytes, but skew model 435a will also indicate a validated skew model where the slave leads the master by 5 bytes. Depending on the needs of the particular application and information about the particular communications channel, when both skew models are valid, arbiter block 437 can use various methods based on various factors to choose a model. For example, arbiter block 437 can select the skew model that has the smaller skew, in which case the performance of the system is approximately equivalent to prior art methods where the maximum skew that can be tolerated is one-half the minimum distance between consecutive markers. Alternatively, arbiter block 437 can wait until one skew model becomes invalid, which can occur, for instance, at the end of a sequence of markers, and then choose the remaining valid model. This technique may not be possible with all communications protocols. Arbiter block 437 can also choose a model based on known characteristics of the communications link. For example, arbiter block 437 can reject a model if the skew predicted by the model is not within a given range of possible skew values. That is, it may be known that a particular communications channel has a minimum and/or maximum skew. Note that while only two skew model blocks are shown in FIG. 4, additional skew model blocks having different models with different assumptions can also be used. For instance, a skew model block that assumes two slave alignment markers will be received before the corresponding master marker is received can be added, which might allow for tolerance of even greater inter-channel skew. To accommodate additional skew model blocks, arbiter block 437 can be extended, and adapted to choose among more than two skew models.

Figure 5:
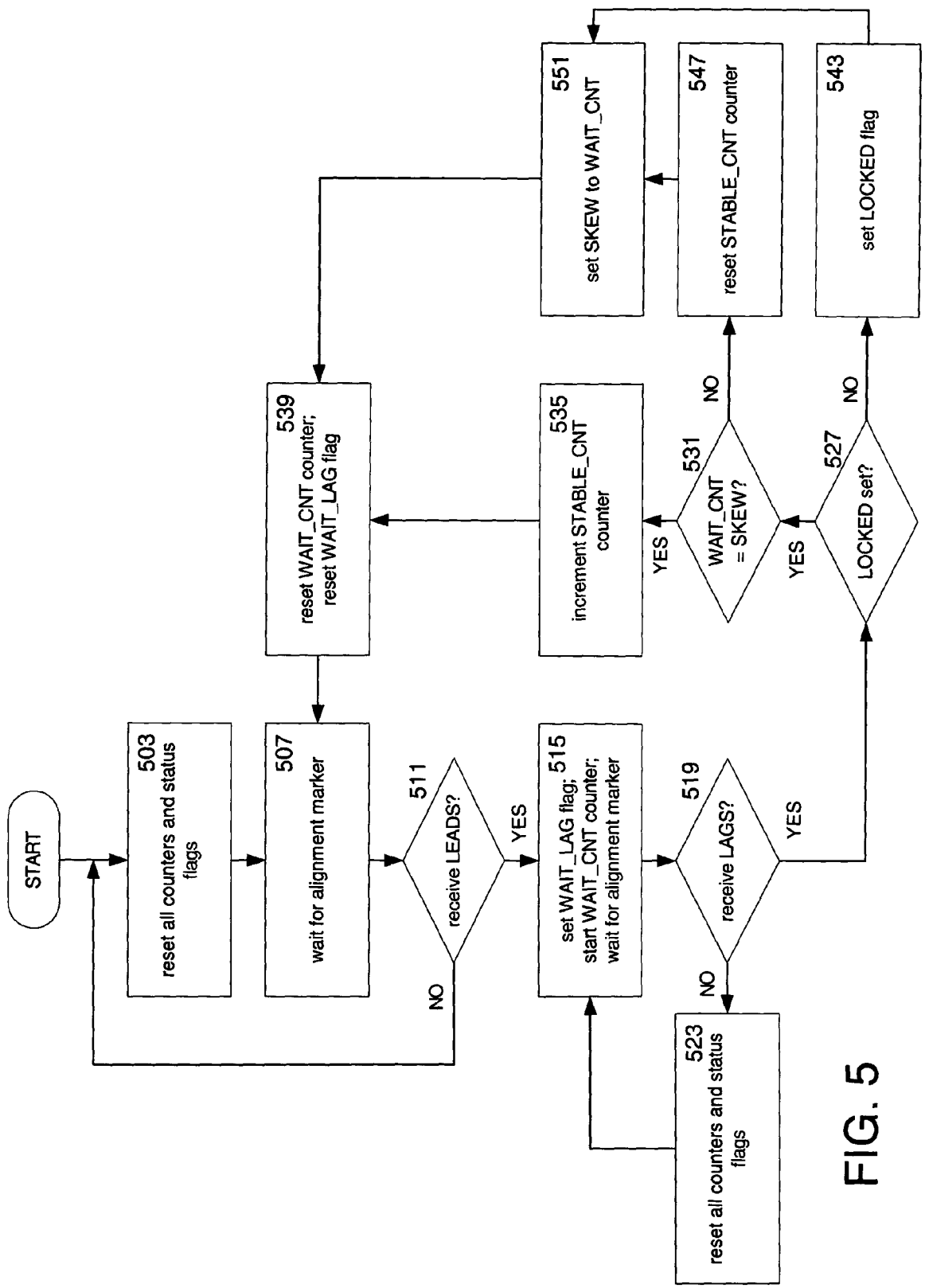
FIG. 5 shows a simplified flow diagram for developing a skew model.

FIG. 5 shows an embodiment of a simplified flow diagram for developing a skew model within skew model blocks 435a and 435b of FIG. 4. In this embodiment, a counter WAIT_CNT is used to measure skew and a counter STABLE_CNT is used to measure the stability of the skew. The embodiment also has status flags WAIT_LAG and LOCKED, and stores a skew value SKEW. Based on an assumption that the markers that arrive at the LEADS input lead the markers that arrive at the LAGS input, the model measures the skew over time and attempts to develop a model for the skew. First, in step 503, all the status flags are cleared and the counters are reset to zero in order to reset the skew model block. At step 507, the skew model block waits for an alignment marker to arrive at its input. In a decision step 511, if the alignment marker is not received at the LEADS input (i.e., it was received at the LAGS input) then the skew model block returns to step 503 to reset itself and wait for the next marker. An alignment marker is expected at the LEADS input first since the skew model block is based on an assumption that the LEADS markers lead the LAGS markers, and therefore, the first marker received should be a LEADS marker.

If at decision step 511 the alignment marker is received at the LEADS input, then in step 515, the WAIT_LAG flag is set (indicating that the leading alignment marker has been received and that the skew model block is waiting for the lagging marker) and the WAIT_CNT counter is started to measure the skew between the leading marker and the lagging marker. The WAIT_CNT marker counts at the same rate as the receive clock in the receiver. That is, the WAIT_CNT counter, for example, counts up for each byte that arrives in the receiver. The skew model block then waits for the next alignment marker. When the next marker is received, in a decision step 519, if the marker is not received at the LAGS input (i.e., the marker is received at the LEADS input) then in step 523, all the status flags and counters are reset and the skew model block returns to step 515 to wait for an alignment marker. This is based on an assumption that the lagging marker will arrive before the next leading marker. Alternative embodiments can be based on other assumptions. For example, if the inter-channel skew exceeds the minimum distance between consecutive markers, an alternative embodiment may first wait until the minimum distance has been passed (ignoring intervening markers) and then start waiting for the lagging marker to occur. In certain cases, multiple parallel skew model blocks may be required in order to cover all possible overlapping waiting windows. Other embodiments will be apparent to one of ordinary skill in the art.

If in decision step 519, the alignment marker is received at the LAGS input, the LOCKED status flag is checked at step 527. The LOCKED flag is used to indicate that the previous pair of master and slave markers resulted in a proper leading and lagging marker pair, and that the skew value stored in SKEW is valid. If at step 527, LOCKED is not set, the LOCKED flag is set in step 543. Then in step 551, SKEW is set to the value of WAIT_CNT, which represents the number of bytes that have been received between the leading and the lagging markers. In step 539, the WAIT_CNT counter and the WAIT_LAG flag are reset, and the skew model block returns to step 507 to wait for the next marker.

Returning to step 527, if the LOCKED flag is already set, then in step 531, the current value in the WAIT_CNT counter is compared with the value stored in SKEW. If the two values are equal, then the stored SKEW value is confirmed and validated, and therefore in step 535, the STABLE_CNT counter is incremented to indicate the stability of the skew model. Then, in step 539, the WAIT_CNT counter and WAIT_LAG flag are reset and the skew model block waits for the next marker. If, on the other hand, in step 531 the value in the WAIT_CNT counter does not equal the value stored in SKEW, then the STABLE_CNT counter is reset in step 547, since the current skew measurement does not match the previously measured skew. In step 551, the current value in the WAIT_CNT counter, representing the new skew measurement, is stored in SKEW. Finally, in step 539, the WAIT_CNT counter and WAIT_LAG flag are cleared and the skew model block waits for the next marker.

Thus, to summarize the operation of skew model blocks 435a and 435b, the skew between a leading alignment marker and a lagging alignment marker is measured by starting a counter (WAIT_CNT) when the leading marker is received (at LEADS), and stopping the counter when the lagging marker is received (at LAGS). That count is the measured skew (SKEW) and is stored. The skew of subsequent leading and lagging marker pairs is measured in the same way and compared with the stored skew value. If the measured skew matches the stored value, and is therefore stable, then a counter (STABLE_CNT) is incremented, indicating the increased stability of the skew measurement. Thus, the STABLE_CNT counter indicates the number consecutive marker pairs having the same measured skew.

If, however, the measured skew does not match the stored skew, then the STABLE_CNT counter is cleared, the new skew measurement is stored, and the process is restarted.

Note that certain details that may be necessary for implementation are not explicitly shown in the flow diagram of FIG. 5 for clarity. For example, a special case occurring when the leading and lagging markers arrive simultaneously (indicating a skew of zero, i.e., no skew) is not depicted. In such an example, the skew model blocks can recognize this special case, store zero as the skew, and increment or clear the STABLE_CNT counter appropriately. As another example, an implementation may need to account for the maximum possible values of the counters. For instance, the WAIT_CNT counter reaching its maximum value indicates that the inter-channel skew is greater than the skew model blocks can measure. In such an instance, the skew model block can indicate an invalid skew (e.g., clear STABLE_CNT) and wait for the next marker pair. If the STABLE_CNT counter reaches a maximum value, then the skew model blocks can stop incrementing that counter as consistent skew measurements continue to be made. These and other implementation details will be readily apparent to one of ordinary skill in the art.

Table I illustrates one possible embodiment of a finite state machine for implementing the skew model blocks 435a and 435b, as described by the flow diagram of FIG. 5. (Note that the embodiments described by the flow diagram of FIG. 5 and the state machine illustrated by Table I differ slightly in minor details.) The columns on the right in Table I indicate the next state of the state machine for the given inputs on the left in Table I. In Table I, "?" represents a "don't care" value, "w" represents the WAIT_CNT counter, "t" represents the STABLE_CNT counter, "s" represents the skew value stored in SKEW, and "max" represents the maximum possible value for the WAIT_CNT counter (and therefore the maximum possible value for s). For instance, in row 13b of Table I, if WAIT_LAG is equal to 1 (indicating the state machine is waiting for the lagging marker), LOCKED is equal to 1 (indicating the value stored in valid), LAGS is equal to 1 (indicating the occurrence of the lagging marker), and w equals s (indicating a consistent skew measurement), then in the next state, WAIT_LAG will be cleared, LOCKED will remain at 1, and STABLE_CNT will be incremented (indicating the measured skew has been consistent and stable for another skew measurement). Note that, although not shown in Table I, once the STABLE_CNT counter reaches its maximum value, it is no longer incremented and remains at that maximum value until cleared. As will be apparent to one of ordinary skill in the art, alternative embodiments having substantially equivalent functionality are possible.

In some applications, the communications channels may make other adjustments to the pointers in the elastic receive buffers for purposes other than channel bonding. For example, a channel may make slight adjustments for clock corrections that compensate for any slight differences between the write and read clocks. This may complicate the tasks of developing a model of skew and performing channel alignment. In one embodiment, clock corrections can be inhibited during channel alignment. In other embodiments, the skew model can be adjusted appropriately to account for any changes to the pointers in the elastic buffers when clock corrections occur.

For the purposes of this disclosure, it was assumed that only one byte is read or written during each clock cycle. In particular, this means that only one alignment marker is received during each clock cycle. However, in general, multiple bytes can be read or written during each clock cycle, and the alignment marker can be any one of the bytes in a multiple byte read or write operation. In such cases and as will be apparent to one of ordinary skill in the art, straightforward changes can be made to the skew model blocks to properly account for this finer granularity within each clock cycle.

It will be apparent to one ordinarily skilled in the art after reading this specification that the present invention can be practiced within these and other architectural variations. The methods of the present invention can be performed in hardware, software, or any combination thereof. In particular, the present methods can be carried out by fixed logic on an integrated circuit, or by appropriately configuring a programmable logic device such as a field programmable gate array. Accordingly, the present invention is not limited to any particular platform.

TABLE I

| Row | LEADS | LAGS | WAIT_LAG | LOCKED | WAIT_CNT | SKEW | WAIT_LAG | LOCKED | WAIT_CNT | SKEW | STABLE_CNT |
|---|---|---|---|---|---|---|---|---|---|---|---|
| 0. | 0 | 0 | 0 | 0 | ? | ? | 0 | 0 | ? | ? | 0 |
| 1. | 0 | 1 | 0 | 0 | ? | ? | 0 | 0 | ? | ? | 0 |
| 2. | 1 | 0 | 0 | 0 | ? | ? | 1 | 0 | 1 | ? | 0 |
| 3. | 1 | 1 | 0 | 0 | ? | ? | 0 | 1 | ? | 0 | 0 |
| 4a. | 0 | 0 | 1 | 0 | w < max | ? | 1 | 0 | w + 1 | ? | 0 |
| 4b. | 0 | 0 | 1 | 0 | w = max | ? | 0 | 0 | ? | ? | 0 |
| 5. | 0 | 1 | 1 | 0 | w | ? | 0 | 1 | ? | w | 0 |
| 6. | 1 | 0 | 1 | 0 | ? | ? | 1 | 0 | 1 | ? | 0 |
| 7. | 1 | 1 | 1 | 0 | ? | ? | 0 | 1 | ? | 0 | 0 |
| 8. | 0 | 0 | 0 | 1 | ? | s | 0 | 1 | ? | s | t |
| 9. | 0 | 1 | 0 | 1 | ? | ? | 0 | 0 | ? | ? | 0 |
| 10a. | 1 | 0 | 0 | 1 | ? | 0 | 1 | 0 | 1 | ? | 0 |
| 10b. | 1 | 0 | 0 | 1 | ? | s > 0 | 1 | 1 | 1 | s | t |
| 11a. | 1 | 1 | 0 | 1 | ? | 0 | 0 | 1 | ? | 0 | t + 1 |
| 11b. | 1 | 1 | 0 | 1 | ? | s > 0 | 0 | 1 | ? | 0 | 0 |
| 12a. | 0 | 0 | 1 | 1 | w < s | s (> 0) | 1 | 1 | w + 1 | s | t |
| 12b. | 0 | 0 | 1 | 1 | w = s < max | s (> 0) | 1 | 0 | w + 1 | ? | 0 |
| 12c. | 0 | 0 | 1 | 1 | w = s = max | s (> 0) | 0 | 0 | ? | ? | 0 |
| 13a. | 0 | 1 | 1 | 1 | w < s | s (> 0) | 0 | 1 | ? | w | 0 |
| 13b. | 0 | 1 | 1 | 1 | w = s | s (> 0) | 0 | 1 | ? | w (= s) | t + 1 |
| 14. | 1 | 0 | 1 | 1 | ? | s (> 0) | 1 | 0 | 1 | ? | 0 |
| 15. | 1 | 1 | 1 | 1 | ? | s (> 0) | 0 | 1 | ? | 0 | 0 |

Those having ordinary skill in the relevant arts of the invention will now perceive various modifications and additions that can be made as a result of the disclosure herein. For example, alternative state machine implementations having different variables and different states can be used, and implementations not involving a state machine, such as implementations using a microprocessor, can be used, and active-high signals can be replaced with active-low signals.

Accordingly, all such modifications and additions are deemed to be within the scope of the invention, which is to be limited only by the appended claims and their equivalents.

What is claimed is:

1. A method for channel bonding a plurality of communications channels comprising:
   receiving a first master alignment marker;
   receiving a first slave alignment marker;
   receiving a second master alignment marker;
   receiving a second slave alignment marker;
   developing a model of skew based on the first and second master alignment markers and the first and second slave alignment markers;
   developing a model of skew in a slave channel based on the first and second master alignment markers and the first and second slave alignment markers; and
   at a time determined by the slave channel, aligning the slave channel based on the developed model of skew.

2. The method of claim 1 further comprising assuming the first master alignment marker leads the first slave alignment marker.

3. The method of claim 1 further comprising assuming the first master alignment marker lags the second slave alignment marker.

4. The method of claim 1 wherein the model of skew indicates a skew value and a stable count.

5. The method of claim 1 wherein aligning the slave channel comprises adjusting a pointer in an elastic buffer of the slave channel.

6. The method of claim 5 wherein the pointer is a read pointer in the elastic buffer of the slave channel.

7. The method of claim 5 wherein adjusting the pointer in the elastic buffer of the slave channel comprises moving the pointer a number of bytes equal to a skew value of the model of skew.

8. The method of claim 5 further comprising:
   if channel alignment is lost, canceling the adjustment to the pointer in the elastic buffer of the slave channel.

9. The method of claim 5 wherein the model of skew is not affected by the adjustment to the pointer.

10. The method of claim 1 wherein a skew value of the model of skew is greater than one-half of a minimum distance between consecutive alignment markers.

11. The method of claim 1 further comprising:
    dividing a data word to be transmitted into a plurality of bytes; and
    transmitting each byte of the plurality of bytes in a separate communications channel of the plurality of communications channels.

12. A method for developing a model of skew in a channel bonded communications channel comprising:
    waiting for a first leading alignment marker;
    waiting for a first lagging alignment marker;
    measuring a first skew value between the first leading alignment marker and the first lagging alignment marker;
    storing the first skew value;
    waiting for a second leading alignment marker;
    waiting for a second lagging alignment marker;
    measuring a second skew value the second leading marker and the second lagging marker; and
    comparing the second skew with the stored first skew value.

13. The method of claim 12 wherein the step of measuring the first skew value comprises counting a number clock cycles between the first leading alignment marker and the first lagging alignment marker.

14. The method of claim 12 wherein the first leading alignment marker is from a master channel and the first lagging alignment marker is from a slave channel.

15. The method of claim 12 wherein the first leading alignment marker is from a slave channel and the first lagging alignment marker is from a master channel.

16. The method of claim 12 further comprising:
    if the stored first skew value equals the second skew value, incrementing a stable count value; and
    if the stored first skew value does not equal the second skew value, storing the second skew value and resetting the stable count value.

17. The method of claim 12 further comprising:
    waiting for a minimum period before waiting for the first lagging alignment marker.

18. A communications system comprising:
    a master channel having a master buffer;
    a slave channel having a slave buffer; and
    control logic for developing a model of a skew between the master channel and the slave channel;
    wherein the control logic comprises:
      a plurality of skew model blocks for developing a plurality of models of the skew between the master channel and the slave channel; and
      an arbiter for choosing one of the plurality of skew model blocks.

19. The communications system of claim 18 further comprising:
    adjustment logic for adjusting a pointer in an elastic buffer of the slave channel based on the developed model of skew, wherein the adjustment logic adjusts the pointer in the elastic buffer of the slave channel at a time determined by the slave channel.

20. The communications system of claim 18 wherein the control logic comprises a finite state machine.

21. The communications system of claim 18 wherein the control logic comprises a microprocessor.

22. The communications system of claim 18 wherein the arbiter chooses a skew model block predicting the smallest skew.

23. The communications system of claim 18 wherein the arbiter chooses a skew model block having a non-zero stable count.

24. The communications system of claim 18 wherein after all but one skew model block has failed, the arbiter chooses the one skew model block that has not failed.

25. The communications system of claim 18 wherein the arbiter chooses a skew model block based on known characteristics of the communications system.

26. The communications system of claim 18 wherein the plurality of skew model blocks comprises:
    a first skew model block for developing a first model of the skew between the master channel and the slave channel; and a second skew model block for developing a second model of the skew between the master channel and the slave channel; and wherein the arbiter chooses one of the first and second skew model blocks.

27. The communications system of claim 26 wherein the first skew model block develops the first model of the skew between the master channel and the slave channel based on an assumption that the master channel leads the slave channel.

28. The communications system of claim 27 wherein the second skew model block develops the second model of the skew between the master channel and the slave channel based on an assumption that the master channel lags the slave channel.

29. The communications system of claim 18 wherein the slave channel comprises a plurality of slave channels, each having a slave buffer, and wherein each slave channel comprises control logic for developing a model of a skew between the master channel and the slave channel.

* * * * *